W. CLAYTON AND G. NODDER.
MANUFACTURE OF BUTTER SUBSTITUTES, EDIBLE FATS, AND THE LIKE.
APPLICATION FILED MAR. 26, 1920.

1,398,003.

Patented Nov. 22, 1921.
2 SHEETS—SHEET 1.

Inventors
W. Clayton
G. Nodder
By H. R. Kerslake
Attorney

W. CLAYTON AND G. NODDER.
MANUFACTURE OF BUTTER SUBSTITUTES, EDIBLE FATS, AND THE LIKE.
APPLICATION FILED MAR. 26, 1920.
1,398,003.
Patented Nov. 22, 1921.
2 SHEETS—SHEET 2.
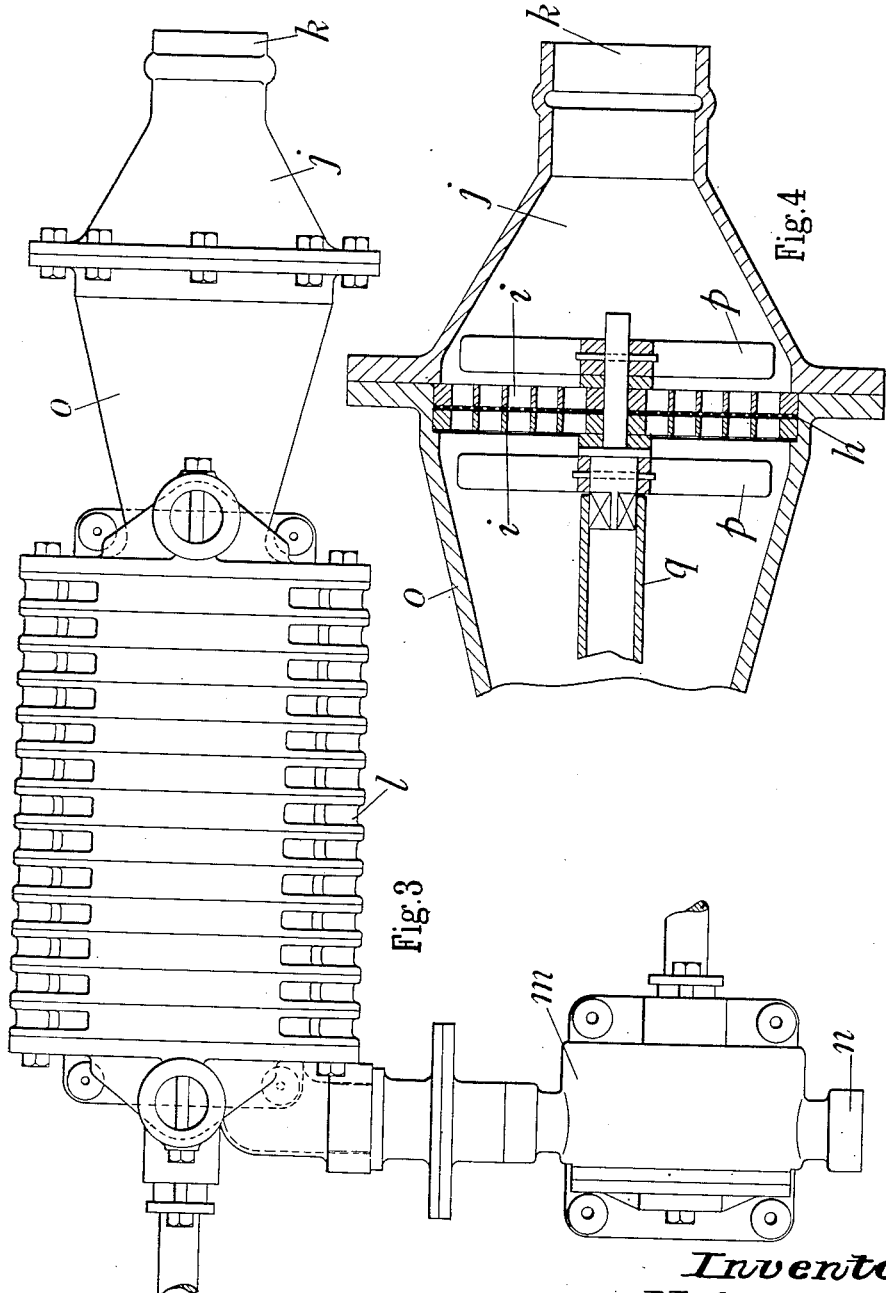
Inventors
W. Clayton
G. Nodder
By H. R. Kerslake
Attorney

UNITED STATES PATENT OFFICE.

WILLIAM CLAYTON, OF LIVERPOOL, AND GERALD NODDER, OF WALLASEY, ENGLAND.

MANUFACTURE OF BUTTER SUBSTITUTES, EDIBLE FATS, AND THE LIKE.

1,398,003.           Specification of Letters Patent.      Patented Nov. 22, 1921.

Application filed March 26, 1920. Serial No. 369,062.

*To all whom it may concern:*

Be it known that we, WILLIAM CLAYTON, residing at 162 North Hill street, Prince's Park, Liverpool, England, and GERALD NODDER, residing at 162 Belvidere road, Wallasey, Cheshire, England, subjects of the King of Great Britain and Ireland, have invented certain new and useful Improvements Relating to the Manufacture of Butter Substitutes, Edible Fats, and the like, of which the following is a specification.

This invention relates to the manufacture of margarin and other butter substitutes, edible fats (such as lard substitutes) and the like.

The object of the present invention is to provide an improved continuous process and inclosed means for the production of margarin and other edible fats.

The invention comprises essentially the treating of a viscous mixture, containing all the required ingredients without excess of any ingredient which must be subsequently extracted, by a cooling process which is immediately followed by a process for rendering the mass homogeneous, the previously prepared material being forced through the two stages without intermission under pressure.

Also the invention comprises the use of a final consolidating process.

Further the invention comprises means as hereinafter described for carrying an improved process into effect.

Referring to the two accompanying sheets of explanatory drawings:—

Figure 1 is a part sectional plan, and Fig. 2 a cross section of a machine constructed in accordance with this invention for use in the manufacture of margarin and other edible fats and the like.

Fig. 3 is a plan of a modified apparatus constructed in accordance with this invention and Fig. 4 is a sectional side elevation to a larger scale than Fig. 3 showing the sieve, kneading arms and discharge nozzle.

Figure 1:
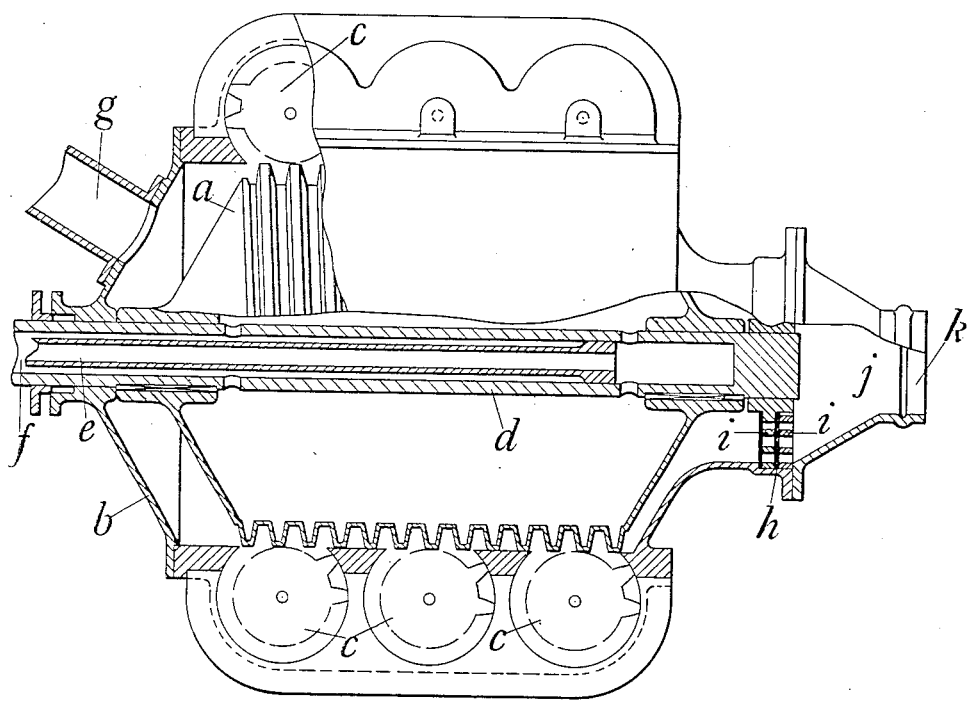
Figure 2:
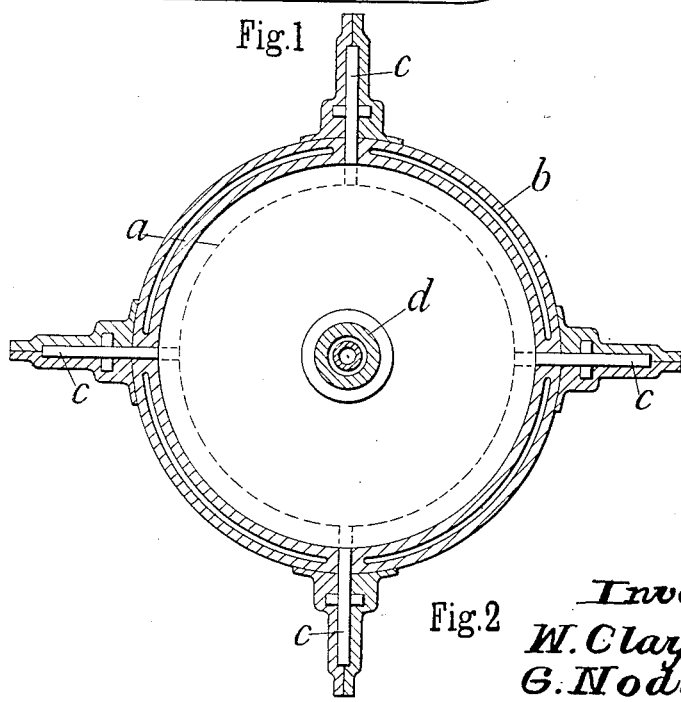

Referring to Figs. 1 and 2, a hollow cylindrical worm $a$ is mounted within a casing $b$ which carries rotatable scraping wheels $c$ engaging with the worm. The shaft $d$ carrying and rotating the worm is made hollow and adapted for the circulation of cooling water through the drum, the water being introduced at $e$ and withdrawn at $f$. The fluid or viscous fat obtained by cooling the emulsion or mixture is passed continuously into the worm casing at $g$ from a vat in which the required constituents are mixed and emulsified. By contact with the worm the fat is further cooled to a temperature at which it can be conveniently worked, and by the action of the worm and scraping wheels it is forced longitudinally through the annular space between the worm and the casing, the scraping wheels serving also to continually remove the chilled fat and expose the whole of the fat to the cooling action of the worm. At the opposite end of the worm casing the fat is forced by the continuous pump action or pressure produced by the worm and scraping wheels through a fine gauze or sieve $h$ supported between a pair of perforated plates $i$. By the sieve the fat is broken up into fine shreds or particles and is thereby reduced to a uniform consistency. After passing through the sieve the fat enters a converging chamber $j$ where it is compressed into a homogeneous mass and is finally extruded through the nozzle $k$. In the above described machine the worm and scraping wheels serve the combined functions of pump and cooler.

It is found more advantageous to perform the pumping and cooling operations in separate parts of the apparatus. The preferred mechanism as shown in Figs. 3–5 includes a cooler $l$ forming the subject of a concurrent patent application by the parties to the present application. The fat is drawn in a viscous condition from an emulsion vat and is fed and forced forward through the cooler by a pump $m$. Any convenient rotary or reciprocating pump is used and this is connected by a suction pipe at $n$ to the emulsion vat.

In the cooler the fat is chilled to a temperature at which it can be conveniently worked, and all the fat is in turn subjected to the cooling process.

From the cooler the fat passes into a chamber $o$ which, though not essentially so, is of gradually increasing diameter, and is fed forward to a sieve $h$ carried between perforated plates $i$. Before and after passing through the sieve the mass may be acted on by beaters $p$ rotated by the shaft $q$. The sieve breaks up the mass into fine particles or shreds and the mass is thoroughly mixed and reduced to a uniform consistency. Finally the mass is consolidated by movement through the converging chamber $j$, and extruded through the nozzle $k$. If desired, any convenient automatic means may be provided for cutting off the finished product into blocks immediately after leaving the machine.

In the manufacture of margarin by machines as above described, the required ingredients are all put into the emulsifying vat, and the composition of the mixture after emulsification is as nearly as possible that of the finished product. After the mixture has been prepared it is advantageous to cool it until it attains as great a viscosity as can be conveniently dealt with by the pump. A temperature of about 21° centigrade is found convenient. The average temperature in the cooler is about 12° centigrade, but varies somewhat with different grades of material, and is therefore several degrees higher than that which is usual in the ordinary crystallizing or solidifying process. While the temperature at the surfaces of the cooler is sufficiently low to produce the desired solidification the mean temperature (e. g. 12° C.) is sufficiently high to enable the mass to be worked without any reheating or discontinuity in the process of manufacture. Ordinarily the product is finished and ready for packing when it leaves the delivery nozzle, but in some cases where it is desired to blend finished products of different qualities, the material is subjected to a blending process which does not form part of the present invention. In some cases the consolidating nozzle may be dispensed with as for example, when the product is discharged into boxes or kegs.

In the manufacture of lard substitutes and other products which are not initially emulsified but are mixed by melting and stirring, the mixture is first partially cooled and then forced by the pump through the above described cooler $l$ and sieve $h$ or its equivalent as above described. The consolidating nozzle may be dispensed with in this case if desired.

Although we have described certain means for carrying the invention into effect we desire it to be understood that our invention is not limited to such means, as the latter may be modified without departing from the essential features of our invention. For example, the pump may be dispensed with and the material forced through the cooler by the elevation of the initial emulsifying or mixing tank sufficiently above the cooling apparatus.

Having thus described our invention what we claim as new and desire to secure by Letters Patent is:—

1. In the manufacture of edible fats such as margarin, lard substitutes and the like, the process comprising thoroughly emulsifying the mixture containing all the required ingredients in the proportion desired in the finished product, then forcing the mixture under pressure through a cooler while simultaneously keeping the ingredients mixed and after the mixture is cooled utilizing the pressure to force the mixture through an additional homogenizing action as described.

2. A process for treating edible fats consisting in preparing a viscous mixture containing all the required ingredients without excess of any ingredients which would ordinarily have to be subsequently extracted, starting said mixture in motion under pressure and simultaneously cooling the same while in motion but after having been cooled utilizing the pressure in further homogenizing the cooled mixture.

3. An apparatus for treating emulsified edible fat including a casing having inlet and outlet openings, means for forcing a viscous mixture through said casing under pressure, and provided with means for simultaneously cooling the mixture, a homogenizer connected to the outlet end of the casing and through which the hardened viscous mixture is forced as described.

4. An apparatus of the kind defined by claim 3 in which the homogenizer is a sheet of wire netting having perforated plates arranged at its opposite sides.

In testimony we have signed our names to this specification.

WILLIAM CLAYTON.
GERALD NODDER.

Witnesses:
WILLIAM PIERCE,
HENRY JOSEPH GREGORY.